March 2, 1943.  F. C. DRAPER  2,312,394
HYDRAULIC MOTOR
Filed March 26, 1941  2 Sheets-Sheet 2

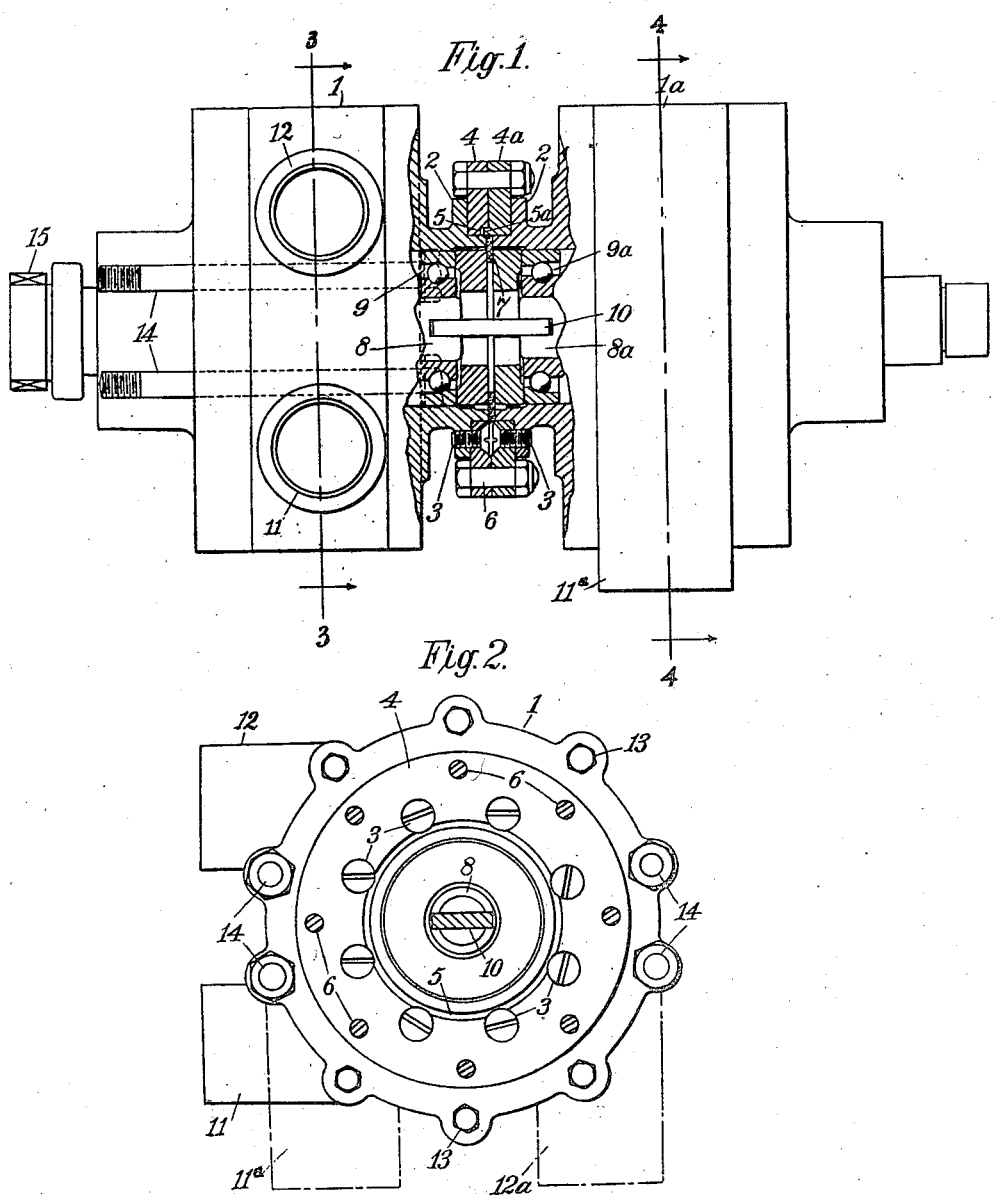

Inventor,
F. C. Draper
By Hascock Downing & Seebold
Attorneys.

Patented Mar. 2, 1943

2,312,394

UNITED STATES PATENT OFFICE 2,312,394

HYDRAULIC MOTOR

Frederick Cecil Draper, Chipping Sodbury, England

Application March 26, 1941, Serial No. 385,360
In Great Britain August 12, 1939

1 Claim. (Cl. 60—97)

This invention relates to hydraulic motors in which the rotor carries in slots sliding blade elements.

Motors of this kind have been employed for a variety of purposes including imparting motion to gun turrets or gun mountings.

In some cases the duties which such motors are required to perform are in excess of those for which they are designed.

Manufacturing difficulties may be presented in increasing the dimensions of the stator or working chamber and the rotor if only for the reason that two sets or series of similar motors will have to be put into production.

It would appear suitable to employ a multiplicity of motors of a given size in performing such duties for which a single motor of that size would be unsuitable, the individual motors being arranged at different points so that they all operate upon a common driven element, for instance, the toothed ring or circular rack for the gun mounting.

There is, however, the possibility with such an arrangement that due to slight variations in the motors themselves or in the valves, pipe lines and other hydraulic components associated with them, the torques of two or more motors will differ slightly or build up at different rates and in consequence a jamming action due to the differential stresses on the mechanical driving means associated with the motors may be produced and increase the mechanical losses in the system or give rise to roughness in operation.

In any case it has been found that with motors of what may be regarded as relatively small dimensions and operated at high speed by fluid under high pressure, a vibration or pulsation is set up and such vibration or pulsation would almost certainly be greater if the size of the individual motors were increased.

For certain purposes hydraulic rotary motors and for instance such as have rotors carrying in slots sliding blades have been arranged substantially coaxially, and in driving connection one with the other and with the device to be driven, the rotors of the several motor elements being secured to a common shaft.

The object of the invention is to provide an improved rotary hydraulic motor of the type in which the rotors carry in slots sliding blades and in which there is provided a plurality of motor elements arranged substantially coaxially and in driving connection one with the other and with the device to be driven.

According to the invention the driving connection between adjacent motor elements is effected through a flexible coupling.

Normally, in accordance with the invention, the stators of the motors are bolted together and to this end the stators may be furnished with flanges to which are secured by, for instance, screws, male and female or, in other words, inter-engaging coupling plates so formed as to facilitate correct alignment, which plates are in turn bolted together. Between the adjacent ends of the stators there may be provided a jointing washer to prevent leakage of the working fluid.

The engagement between the shafts of the rotors may be effected by means of a plate, the ends of which engage in slots provided on the ends of the rotor shafts, such an arrangement providing for a certain degree of elasticity of drive between the rotors.

Preferably, an out of phase arrangement of the blades of one rotor with respect to the blades of another rotor or other rotors is secured in order to neutralise, so far as may be, the slight impulses or irregularities in the torques or rotations of the individual motors and thereby secure an improved smoothness of running.

To assist in securing this out-of-phase arrangement of the blades it may be found advantageous to define the angle between the slots in the ends of the shafts and the position of the blades in the end of the rotors, so that the ports in the stators of the several motors will be uncovered successively or at different times.

The invention will be described in detail by way of example with reference to the accompanying drawings.

Figure 1 is a view in elevation partly in section of a motor comprising two motor elements in accordance with the invention.

Figure 2 is a view in end elevation of one of the motor elements in accordance with the invention.

Figure 3:
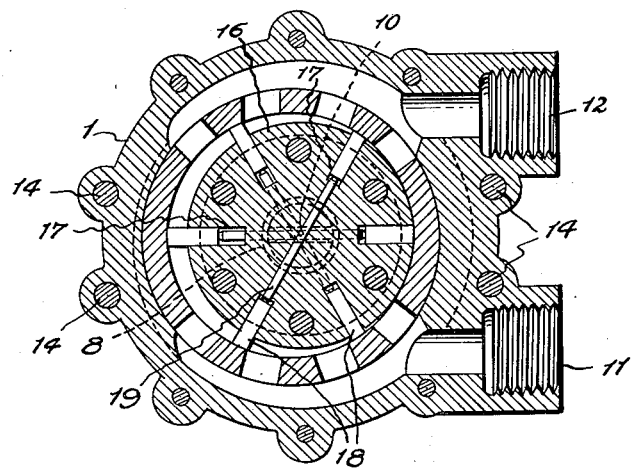
Figure 3 is a section on a plane indicated by the line 3—3 of Figure 1.

The stators of the two motor elements 1 and 1a are arranged substantially coaxially, each being provided with a flange 2 to which is secured by screws 3 interengaging coupling plates one of which 4 is a female element and the other 4a a male element, the elements in question being, respectively, furnished with an annular recess 5 and an annular elevation 5a designed to facilitate correct alignment, the plates being secured together by means of bolts 6.

Between the adjacent ends of the stators there is provided a jointing washer 7 to prevent leakage of the working fluid. The engagement between the shafts 8 and 8a of the rotors which are arranged in ball bearings, of which only 9 and 9a can be seen, is secured by means of a plate 10 engaged in slots provided in the ends of the rotor shafts, such an arrangement providing for a certain degree of elasticity between the drive of the rotors.

As pointed out above, an out-of-phase arrangement of the blades of one rotor with respect to the blades of another rotor or other rotors is secured in order to neutralise, so far as may be, the slight impulses or irregularities in the torques or rotations of the individual motors and thereby secure an improved smoothness of running, and to the like end the inlet connections 11 and 11a and the outlet connections 12 and 12a are arranged at an angle 90° with respect to one another.

In the construction illustrated the stators comprise two end elements and a central element engaged together by bolts 13, further bolts 14 being provided for engaging the stators in position on a suitable mounting, so that the pinion 15 may be engaged with means to which motion is to be imparted by the motor.

Figure 4:
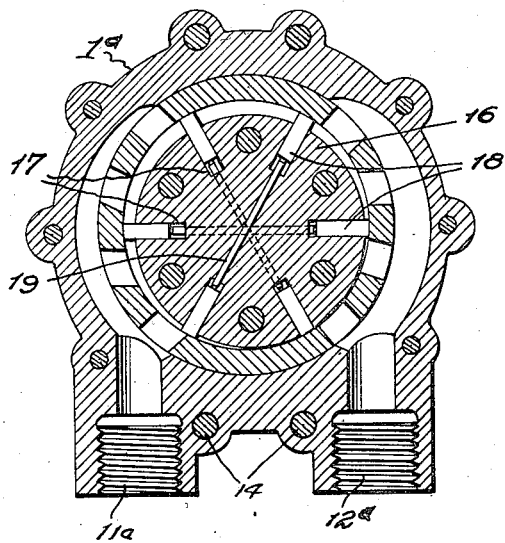
Figure 4 is a section on a plane indicated by the line 4—4 of Figure 1.

In Figures 3 and 4, the construction of the two rotors and the out-of-phase arrangement of the blades in the two rotors is shown.

The rotors, as will be seen from these figures, comprise a rotor body 16 furnished with a plurality of slots 17 in which are slidably engaged blade elements 18 between which are arranged distance pieces 19 extending diametrically across the rotor body and operating to cause the blades on the one side of the rotor to have motion imparted to them in an outward direction corresponding with the motion in an inward direction which is imparted to its related blade on the other side of the rotor and vice versa.

As will be seen from Figures 3 and 4, the blade elements of the one rotor shown in Figure 3 are arranged in out-of-phase relationship with the blade elements provided in the rotor body of the other rotor shown in Figure 4 so that the inlets 11, 11a being connected to a common intake or pressure pipe and the outlets 12, 12a being connected to a common exhaust pipe, the flow in these pipes more nearly approaches the condition of constant flow than would be the case if the blade elements in the two rotors were in phase.

I claim:

In a hydraulic motor, a plurality of substantially coaxial motor elements each including a stator and a rotor having slots receiving sliding blades, a flexible coupling establishing a driving connection between the several motor elements inter-engaging coupling plates secured to the stators and at a position between them to facilitate correct alignment of the motor elements.

FREDERICK CECIL DRAPER.